(12) United States Patent
Garskof

(10) Patent No.: US 9,021,586 B2
(45) Date of Patent: Apr. 28, 2015

(54) APPARATUS AND METHODS FOR PREVENTING CROSS-SITE REQUEST FORGERY

(75) Inventor: Robert Garskof, Northford, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 795 days.

(21) Appl. No.: 12/839,884

(22) Filed: Jul. 20, 2010

(65) Prior Publication Data

US 2012/0023377 A1 Jan. 26, 2012

(51) Int. Cl.
| | |
|---|---|
| G06F 11/00 | (2006.01) |
| G06F 21/44 | (2013.01) |
| G06F 17/30 | (2006.01) |
| H04L 29/06 | (2006.01) |

(52) U.S. Cl.
CPC .......... *G06F 21/44* (2013.01); *G06F 17/30887* (2013.01); *H04L 63/1425* (2013.01); *H04L 63/1441* (2013.01); *G06F 2221/2101* (2013.01); *G06F 2221/2119* (2013.01)

(58) Field of Classification Search
CPC ............ H04L 63/1408; H04L 63/1441; H04L 63/1466; H04L 63/1483; H04L 63/1425
USPC ........................ 726/9, 12, 22, 23, 26; 709/224
See application file for complete search history.

(56) References Cited

U.S. PATENT DOCUMENTS

| | | | |
|---|---|---|---|
| 6,349,336 B1 * | 2/2002 | Sit et al. ........................ | 709/227 |
| 2004/0044768 A1 * | 3/2004 | Takahashi ..................... | 709/225 |
| 2008/0163337 A1 * | 7/2008 | Tuliani et al. .................... | 726/2 |
| 2008/0263650 A1 * | 10/2008 | Kerschbaum ..................... | 726/9 |
| 2008/0275980 A1 * | 11/2008 | Hansen ......................... | 709/224 |
| 2009/0182843 A1 * | 7/2009 | Hluchyj et al. ................ | 709/219 |
| 2009/0249440 A1 * | 10/2009 | Platt et al. ......................... | 726/1 |
| 2009/0300359 A1 * | 12/2009 | Gao et al. ....................... | 713/171 |
| 2010/0088761 A1 * | 4/2010 | Podjarny et al. ................ | 726/22 |
| 2010/0229243 A1 * | 9/2010 | Lin et al. .......................... | 726/27 |
| 2011/0131635 A1 * | 6/2011 | Schneider .......................... | 726/5 |
| 2011/0154473 A1 * | 6/2011 | Anderson et al. ............... | 726/11 |
| 2011/0283110 A1 * | 11/2011 | Dapkus et al. .................. | 713/182 |
| 2011/0296036 A1 * | 12/2011 | Canning et al. ............... | 709/228 |
| 2011/0321168 A1 * | 12/2011 | Amit et al. ....................... | 726/26 |
| 2013/0232210 A1 * | 9/2013 | Hluchyj et al. ............... | 709/206 |

* cited by examiner

*Primary Examiner* — Saleh Najjar
*Assistant Examiner* — Peiliang Pan
(74) *Attorney, Agent, or Firm* — Myers Bigel Sibley & Sajovec

(57) ABSTRACT

Apparatus and methods are provided that prevent cross-site request forgery at one or more web servers. A proxy dynamically monitors web server responses to client requests for content having a selected characteristic, adds a hidden token to content identified as having the selected characteristic prior to serving the content to a requesting client, and stores a copy of the hidden token for later verification that client request content sent to a web server is authentic. The proxy monitors client request content sent to the one or more web servers for a selected characteristic, and allows client request content having the selected characteristic to be processed by a web server application only if the client request content includes a token previously provided by the proxy and only if the token has a value matching a stored token value for the respective client.

14 Claims, 6 Drawing Sheets

APPARATUS AND METHODS FOR PREVENTING CROSS-SITE REQUEST FORGERY

BACKGROUND

The present application relates generally to HTML based applications such as web browser and embedded HTML-based applications and, more particularly, to HTML-based application security.

Communications networks are widely used for nationwide and worldwide communication of voice, multimedia and/or data. As used herein, the term "communications network" includes public communications networks, such as the Public Switched Telephone Network (PSTN), terrestrial and/or satellite cellular networks, private networks and/or the Internet.

The Internet is a decentralized network of computers that can communicate with one another via Internet Protocol (IP). The Internet includes the World Wide Web (web) service facility, which is a client/server-based facility that includes a large number of servers (computers connected to the Internet) on which web pages or files reside, as well as clients (web browsers), which interface users with the web pages. The topology of the web can be described as a network of networks, with providers of network services called Network Service Providers, or NSPs. Servers that provide application-layer services may be referred to as Application Service Providers (ASPs). Sometimes a single service provider provides both functions.

The Open Web Application Security Project (OWASP) is an organization whose goal is to assist individuals, businesses and agencies in finding and using trustworthy software. OWASP maintains a "Top Ten" list of the ten most dangerous current web application security flaws, along with suggested methods for dealing with those flaws.

Cross-site request forgery (CSRF) currently is one of OWASP's top ten most dangerous security flaws. CSRF is a method of attacking a web site wherein an intruder masquerades as a legitimate and trusted user of the web site. CSRF attacks can be performed by stealing the identity of an existing user and then hacking into a web server using that identity. A CSRF attacker may also trick a legitimate user into unknowingly sending Hypertext Transfer Protocol (HTTP) requests to a web site that returns sensitive user data to the attacker. A CSRF attack can be used to modify firewall settings, post unauthorized data on a forum and/or conduct fraudulent financial transactions. CSRF attacks may also be executed, for example, by using a Hypertext Markup Language (HTML) image tag, or JavaScript image object. Typically, an attacker will embed an image tag or object into an email or website so that, when a user loads the page or email, they perform a web request to a web site selected by the attacker. For example, and image tag such as <img src="http://host/?command">, when loaded by a user performs a web request to the address specified in the tag (i.e., http://host/).

CSRF protection is required for Payment Card Industry (PCI) compliance with security standards developed to protect card information during and after a financial transaction. Conventional approaches to protecting against CSRF attacks include tagging HTML elements, such as forms, with a hidden input variable that is randomly generated and checked against the page session to validate that the source of the request is in fact the authenticated party. For example, when a web application generates a link or form that invokes a web application upon activation by a user, a query parameter is included with the link or form by the web application. Prior to executing the web application in response to user activation of the link of form, a token value provided by the user is compared with a stored value to verify that the user is authorized to invoke the web application. Thus, conventional CSRF protection requires code additions to each web application in order to perform the above-described operations. Unfortunately, if access to the code of a web application is not available, it may not be possible to implement CSRF protection for that application.

In addition, in enterprises with many web applications, code additions/changes necessary to implement CSRF protection can be costly and time consuming to implement and manage. While tagging HTML content, such as forms, with a hidden value is not difficult in and of itself, the amount of content that can expose private data elements across a large enterprise can make this difficult. Often, new unprotected forms crop up faster than they can be found and corrected. As such, for large enterprises, such as enterprises having hundreds or thousands of web sites, closing all CSRF vulnerabilities may not be possible.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

In some embodiments, a Random External Token Management (RETM) module acts as a proxy and independent of any web applications to prevent cross-site request forgery at one or more web servers by dynamically monitoring web server application responses to client requests for content having a selected characteristic, and adding a hidden token to content identified as having the selected characteristic prior to serving the content to a requesting client. The proxy also stores a copy of the hidden token for later verification that client request content sent to a web server is authentic. In some embodiments, the content is hypertext markup language (HTML) content, and the content having the selected characteristic is a hypertext markup language form. The proxy is configured to add a hidden field to the form as the hidden token. The name and value of the hidden field is saved to a hypertext transfer protocol (HTTP) session for the requesting client and attached to a cookie sent to the client.

The proxy also monitors client request content sent to the one or more web servers for a selected characteristic, and allows client request content having the selected characteristic to be processed by a web server application only if the client request content includes a token previously provided by the proxy and only if the token has a value matching a stored token value for the respective client. For example, if an HTTP POST is sent to a web server from a client, the proxy determines whether the HTTP POST contains a hidden field previously added to a form by the proxy. If the HTTP POST does contain the hidden field, the proxy verifies that the value of the hidden field matches a stored value associated with the respective client. If the HTTP POST does contain the hidden field and the value of the hidden field matches a stored value associated with the respective client, the proxy removes the hidden field and allows the HTTP POST (or other client request content) to be processed by the web server application. If the HTTP POST does not contain the hidden field or the value of the hidden field does not match a stored value associated with the respective client, the proxy does not allow the client request content to be processed and sends an error message to the requesting client.

RETM modules are advantageous over conventional methods for preventing CSRF attacks because an RETM module is independent of web applications. As such, an RETM module does not need or require access to web application code. The RETM module can protect many web sites at the same time and can be a central point for logging and auditing CSRF attack attempts. Because of the ability to protect multiple web applications at the same time, an RETM module can keep an audit trail of CSRF attack attempts across a large number of web sites. An RETM module is also advantageous because it can make a PCI application that is non compliant with the CSRF requirement for PCI certification fit the compliance model. RETM modules can be used in a number of ways. Two forms an RETM module can take are that of a external proxy, or an internal proxy. In other words RETM as a module can be used external to a web (HTML) application, or can be internal to that application. But in both cases it is "outside" of the code of the application. The "inside" and "outside" embodiments refer to if it is in the same process space (memory space) of the target application, or outside of it.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Other methods, apparatus and/or computer program products according to exemplary embodiments will be or become apparent to one with skill in the art upon review of the following drawings and detailed description. It is intended that all such additional methods, apparatus and/or computer program products be included within this description, be within the scope of the present invention, and be protected by the accompanying claims.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

Figure 1:
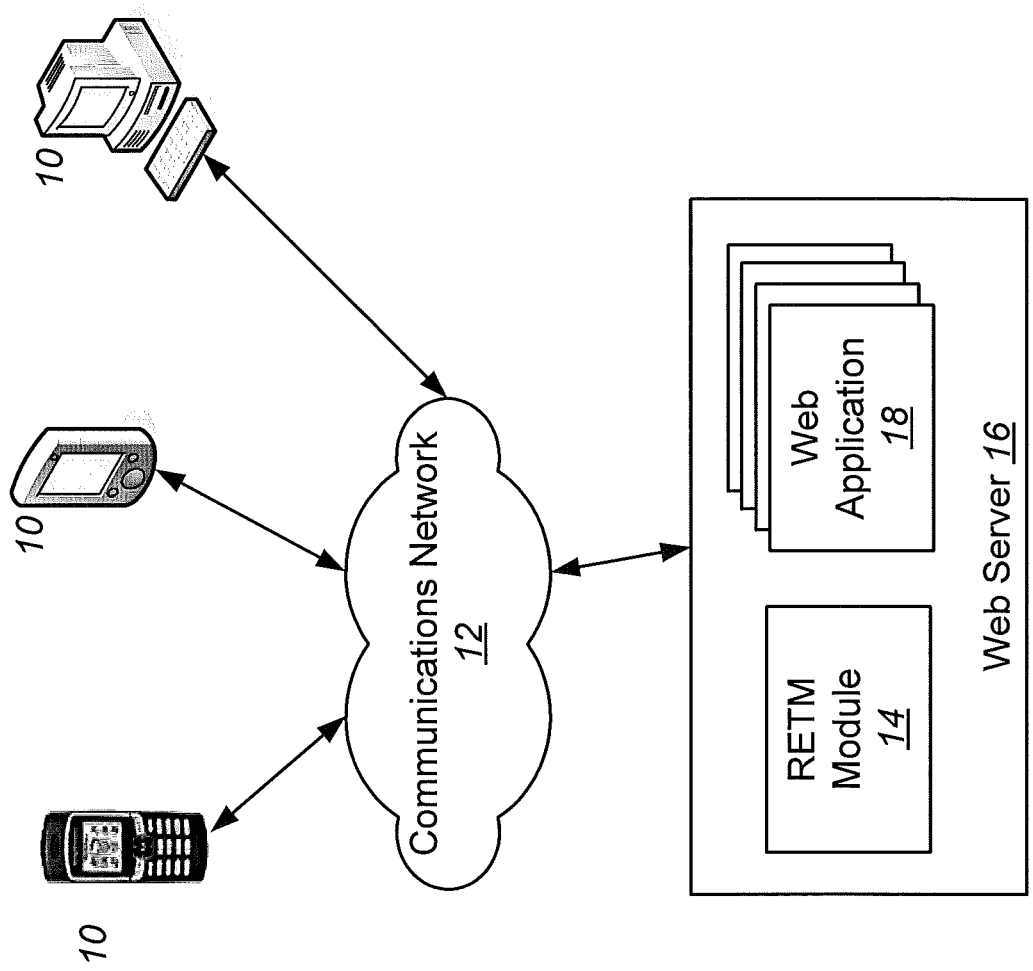
FIGS. 1 and 2 are block diagrams of methods and apparatus for preventing cross-site request forgery at one or more web servers, according to some embodiments.

While various modifications and alternative forms of the embodiments described herein may be made, specific embodiments are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terms "browser" and "web browser" are interchangeable and mean a client program that uses Hypertext Transfer Protocol (HTTP) to make requests of web servers throughout the Internet on behalf of the browser user.

The term "cookie", as used herein, means information that is stored by a web server on a client side of a client/server communication. A cookie is a mechanism that allows a web server to store its own information about a user on the user's own computer.

A "proxy server" refers to a server that acts as an intermediary between a client application and a server application. A "proxy" is located between a client and a server and performs one or more tasks as a request makes its way to the server. A proxy is a component that receives client requests, provides some value added service or function, and then passes that request, possibly after altering it, on to the target server (or another proxy). The terms "proxy" and "proxy server" as used herein are intended to be interchangeable. RETM as a proxy can be a proxy unto itself, or can be a function that is added to another proxy that already exists. For example, in some embodiments of the present invention, an RETM module can be added to a conventional web proxy that caches page requests. RETM is a module that fits into an external or internal proxy, either stand along or mixed with another proxy. This is one of the most powerful features of RETM as an idea, that it can be used anywhere, without altering the code of the application or applications for which it is providing CSRF protection.

The term "real time", as used herein, means that the RETM module can add a hidden token to content substantially at the same time as the RETM module identifies content from a web application having a selected characteristic.

The term "reverse proxy", as used herein, is a proxy server that is used as an intermediary by Internet users who want to access an internal web site, by sending it requests indirectly. A reverse proxy is designed to protect an internal web server from direct outside attacks. A reverse proxy intercepts both inbound and outbound traffic. A RETM module, in some embodiments, can be implemented as a full reverse proxy.

An HTTP session maintains state across multiple "connections". The idea is that each connection from a client to a server is atomic, independent, and has no "knowledge" of previous or future connections. A session is set of data objects that maintain some sort of state or knowledge from one connection to another such that a system can provide a sense of continuity to the client.

The term "single sign-on" (SSO), as used herein, refers to a session/user authentication process that permits a user to log in once to a particular realm (i.e., an SSO realm) and then be able to access multiple secured resources within that realm. A realm defines a family of applications for which a single login will function. The process authenticates the user for all the applications the user has been given rights to and eliminates further prompts when the user switches applications during a particular session.

The term "token", as used herein, means a unit of data that contains security information for a login session and that identifies a user, a user's groups, and the user's privileges. A hidden field within an HTML form is one type of token, for example. A cookie is another type of token.

It will be understood that, although the terms first, second, etc. may be used herein to describe various elements, these elements should not be limited by these terms. These terms are only used to distinguish one element from another.

Exemplary embodiments are described below with reference to block diagrams and/or flowchart illustrations of methods, apparatus (systems and/or devices) and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.). Furthermore, exemplary embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Embodiments provide full protection from CSRF attacks without requiring application code to be changed. Moreover, CSRF vulnerable applications need not have access to the source code implementing CSRF protection.

FIG. 1 illustrates various user devices 10 in communication with a web server 16 via a communications network 12, such as the Internet. The user devices 10 may be any type of device including, but not limited to, desktop computers, handheld computing devices, mobile phones, set top boxes for IP television (IPTV), etc. Each user device 10 includes a client program, such as a web browser, that uses Hypertext Transfer Protocol (HTTP) to send requests to the web server 16 which, in turn, processes the requests via one or more web applications 18. The web server 16 is associated with a Random External Token Management (RETM) module 14 that is configured to prevent CSRF at the web server 16. Although illustrated as associated with only one web server 16, the RETM module 14 can be associated with and provide CSRF protection for a plurality of web servers. The RETM module 14 is independent of all web applications and is positioned within the path of requests and responses between clients and web servers. Although illustrated as part of a web server in FIG. 1, an RETM module is not limited to this embodiment. RETM is a function which is a logical proxy that can be inside of a web server, application sever, firewall, security proxy, or its own stand alone run time; really anything that can act as a proxy to the target application.

Figure 2:
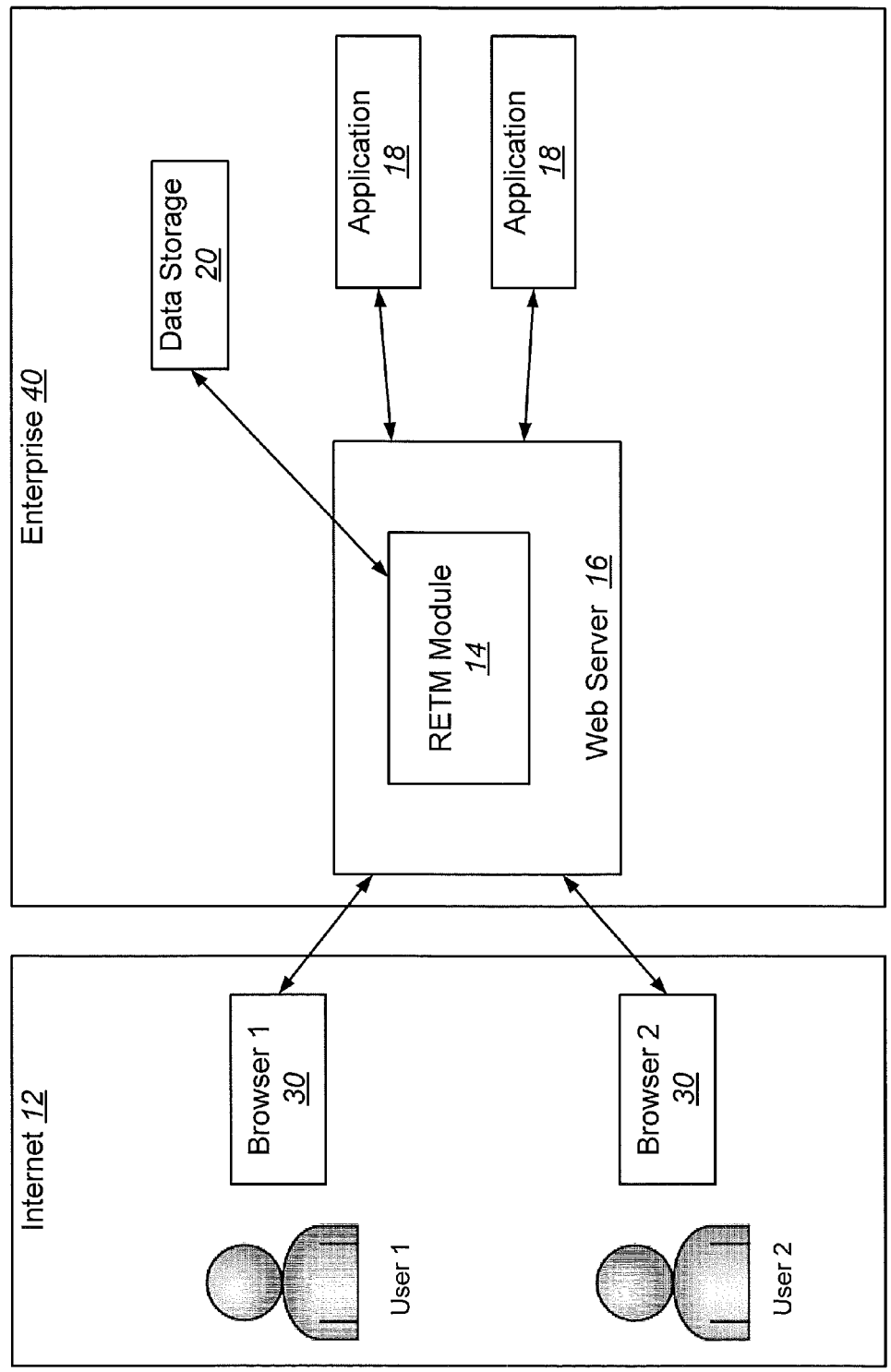

Referring to FIG. 2, the RETM module 14 of FIG. 1 is described in further detail. The RETM module 14 is an application component that acts as an external reverse proxy which sits in front of the web applications it is protecting. In some embodiments, the RETM module 14 can be a stand-alone application that acts as a full reverse proxy. In other embodiments, the RETM module 14 can be a module inside an existing reverse proxy server, such as a web server (e.g., Apache web server module, etc.), or an SSO proxy (e.g., IBM Tivoli Access Manager Web Seal or Web Plugin, etc.). In some embodiments, the RETM module 14 can be an integrated part of an application container such as a JEE container or .Net container. In some embodiments, the RETM module 14 can be an integrated part of a firewall application, switch, and/or load balancer. In some embodiments, the RETM module 14 can be an integrated part of an authentication server. As known to those skilled in the art, an authentication server is an application that facilitates authentication of an entity that attempts to access a network and can reside in a dedicated computer, an Ethernet switch, an access point or a network access server. The RETM module can be associated with a single web server or with multiple web servers, for example, multiple web servers within an enterprise 40. Although illustrated as part of a web server in FIG. 2, an RETM module is not limited to this embodiment.

The illustrated RETM module 14 is configured to prevent cross-site request forgery at one or more web servers 16 of the enterprise 40 by monitoring web server responses to client requests for content having a selected characteristic and dynamically adding a hidden token to content identified as having the selected characteristic prior to serving the content to a requesting client. The RETM module 14 also stores a copy of the hidden token for later use in verifying the authenticity of a client request. For example, the RETM module 14 scans all HTML pages being served to a user's browser 30 for a selected characteristic, such as whether or not the HTML pages contain an HTML form.

HTML forms are used to pass data to a web server and are created via the use of the <form>tag. An HTML form can contain input elements like text fields, checkboxes, radio-buttons, submit buttons and the like. An HTML form is identified by the RETM module 14 by scanning for HTML form tags.

Upon identifying a form, the RETM module 14 adds a token, such as a hidden field, to the form. The name and value of the hidden field is then saved in RETM data storage 20. The name and value of the hidden field is mapped to the session of RETM with the respective browser 30 and attached to a cookie sent to the browser 30. In some embodiments, the hidden field is given a name having random characters, for example, a name having at least forty (40) random characters.

The RETM module 14 also monitors client request content sent to one or more web servers for a selected characteristic such as, for example, whether or not the client request content includes an HTML form. On the inbound, the RETM module 14 looks for an HTML form submission (i.e., HTTP POST). The hidden form field will appear as a data value on the POST as an argument which can then be mapped back to the RETM session for that user to validate that this form was created by the target application for the target user, which is the foundation of any strategy to prevent CSRF. The RETM module 14 allows client request content having the selected characteristic to be processed by a web server application only if the client request content includes a token previously provided by the proxy server and only if the token has a value matching a stored token value for the respective client. For example, if the RETM module 14 detects an HTML form in a client request received at the web server 16, the RETM modules 14 determines whether the form includes a hidden field previously added by the RETM module 14. If a hidden field is detected, the RETM module 14 then verifies whether or not the hidden field has a value matching a stored token value for the respective client. If the value matches the stored value, the RETM module 14 removes the token from client request content (i.e., removes the hidden field from the HTML form) and allows the client request content to be processed by a web server application 18. By verifying that a form contains a hidden field with a value matching a stored value, the RETM module 14 verifies that the form came from the web server that issued the form, and not from another source.

The RETM module 14 sends an error message to the requesting client if the client request content does not contain a token previously provided by the proxy server. For example, if an HTTP POST is detected in the client request content, the RETM module 14 will send an error message to the client 30 if the HTTP POST does not contain a hidden field previously inserted by the RETM module 14. Also, the RETM module 14 sends an error message to the requesting client 30 in response to client request content not having a token previously provided by the proxy server with a value matching a stored token value for the respective client 30.

Figure 3:
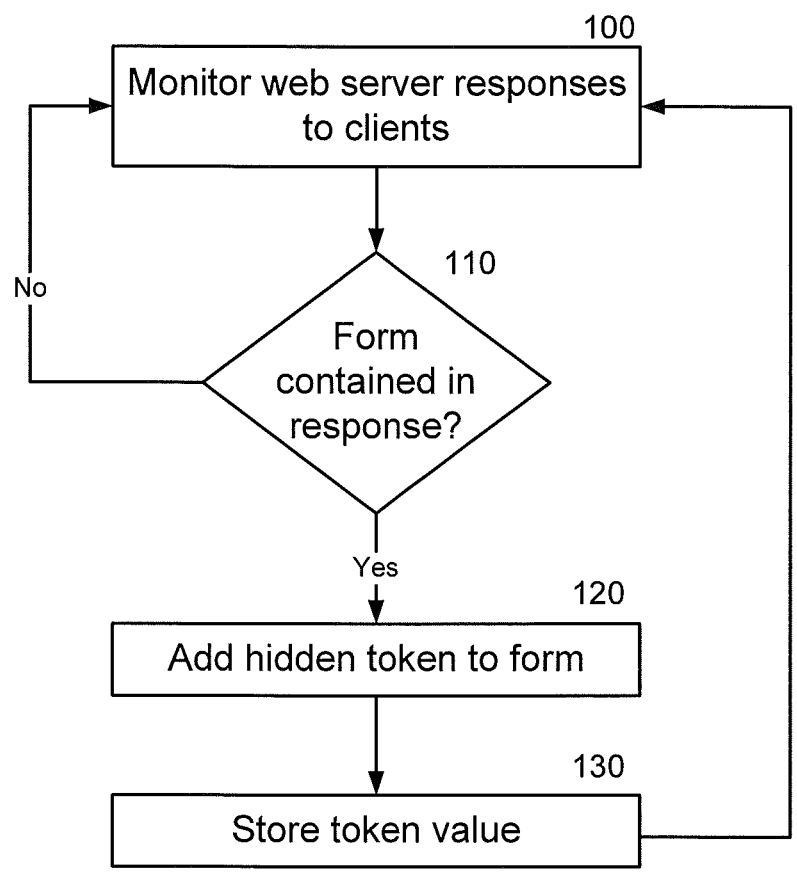
FIGS. 3 and 4 are flowcharts that illustrates exemplary operations for preventing cross-site request forgery at one or more web servers, according to some embodiments.
Figure 4:
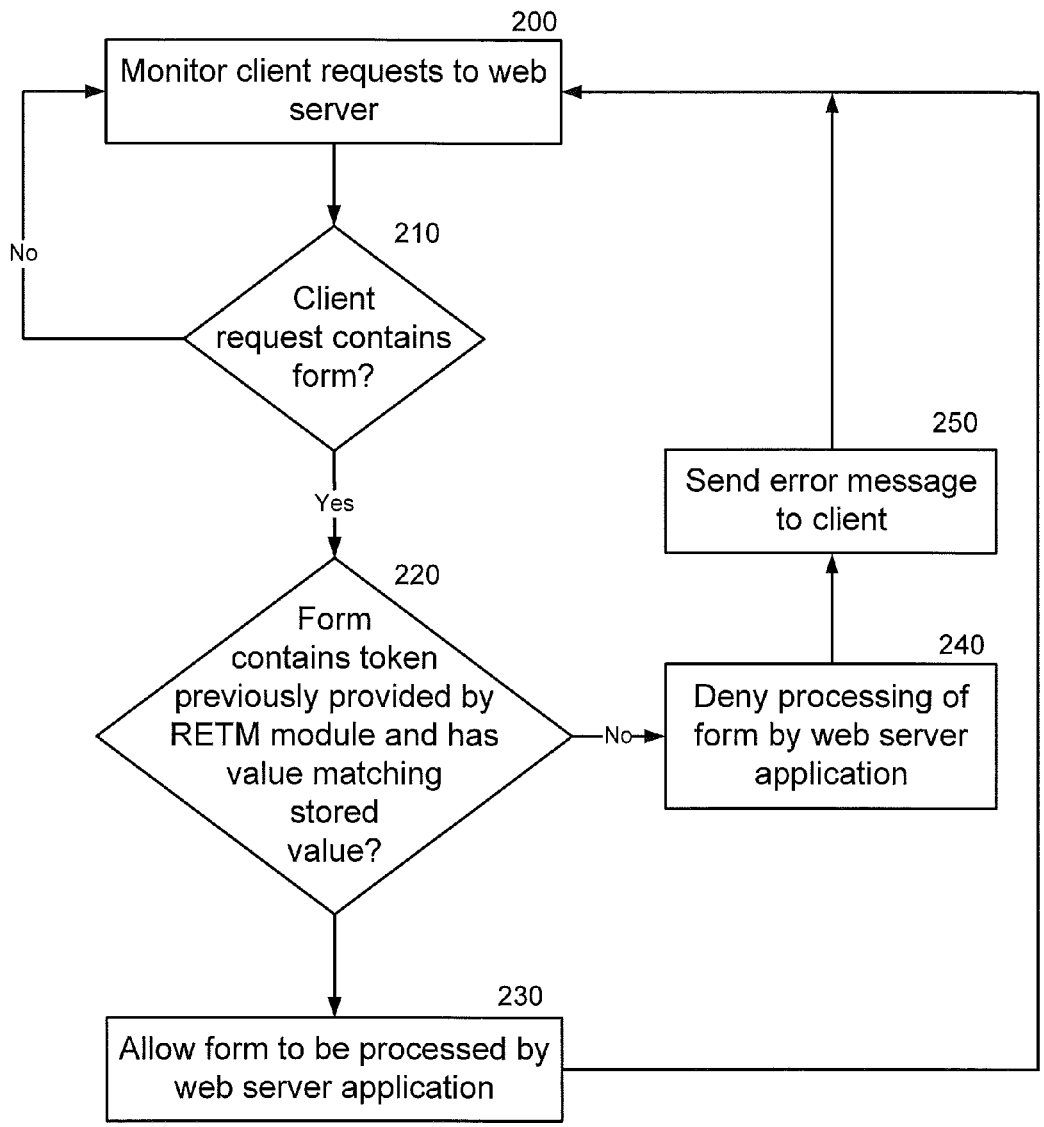

FIGS. 3 and 4 are flowcharts that illustrates exemplary operations for preventing cross-site request forgery at one or more web servers, according to some embodiments. In FIG. 3, an RETM module (14, FIG. 2) associated with a web server 16, monitors web server responses to clients (Block 100). If an HTML form is contained in the response (Block 110), the RETM module adds a hidden token (e.g., a hidden field) to the form (Block 120) and stores the token value for later reference (Block 130). In FIG. 4, the RETM module (14, FIG. 2) monitors client requests to one or more web servers (Block 200). If a client request contains an HTML form (Block 210), the RETM module (14, FIG. 2) determines whether or not the form includes a token previously provided by the RETM module and whether the token has a value that matches a stored value for the requesting client (Block 220). If the token value matches the stored value, the RETM module (14, FIG. 2) removes the token from client request content (i.e., removes the hidden field from the HTML form) and allows the client request content to be processed by a web server application (Block 230). If the client request content does not contain a token previously provided by the proxy server, the RETM module (14, FIG. 2) denies processing of the request (Block 240) and sends an error message to the requesting client (Block 250). Also, if the client request content contains a token previously provided by the RETM module but the token value does not match a stored value, the RETM module denies processing of the request (Block 240) and sends an error message to the requesting client (Block 250).

Figure 5:
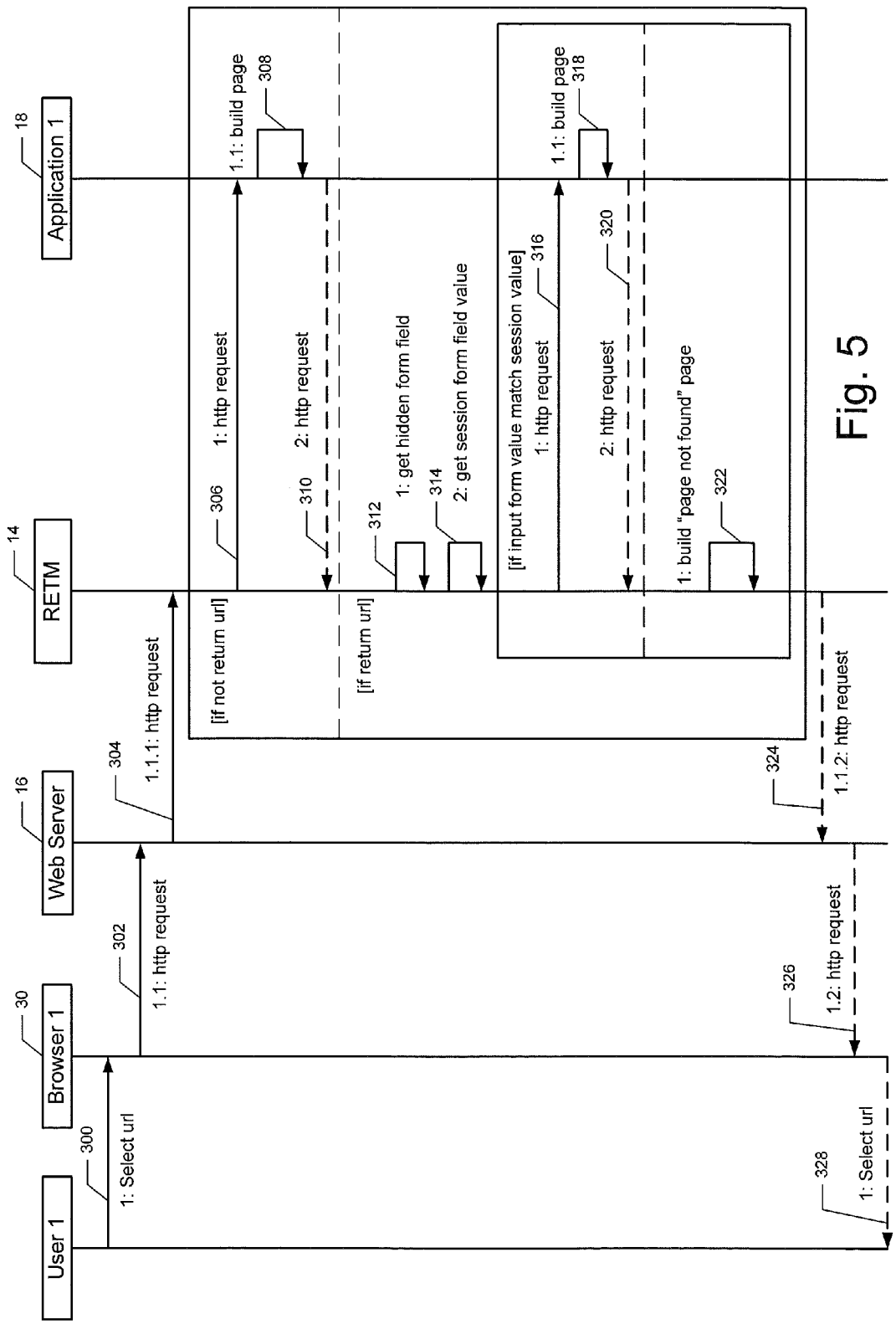
FIG. 5 is a sequence diagram of client requests and web server responses that illustrate details for preventing cross-site request forgery, according to some embodiments.

FIG. 5 is a sequence diagram of client requests and web server responses that illustrate details for preventing cross-site request forgery via an RETM module (14, FIG. 2), according to some embodiments. Initially, a user selects and enters a URL into a client program, such as a browser 30 (Event 300). The URL represents an HTTP request to a web server 16. The browser sends the HTTP request to the designated web server 16 (Event 302). The web server 16 passes the request to an application 18 (Events 304, 306) and the application processes the request and builds a response to the HTTP request (Event 308). The RETM module 14 monitors the response to the HTTP request to detect whether an HTML form is present and, upon detecting an HTML form, the RETM module 14 inserts a hidden field in the form and stores the field value (Event 310).

Upon detecting an HTML form in a client request, the RETM module 14 determines whether there is a hidden form field (Event 312) and, if yes, whether the identified hidden form field has a value matching a stored value for this client (Event 314). If the hidden field value matches the stored value, the RETM module 14 removes the hidden field from the HTML form and allows the client request content to be processed by a web server application 18 (Events 316, 318). The response from the application 18 is then served to the client (Events 320, 324-328). If no hidden field is present or if a value of a hidden field does not match a stored value, the RETM module 14 denies processing of the HTTP request and an error message is sent to browser 30 (Events 322-328).

Figure 6:
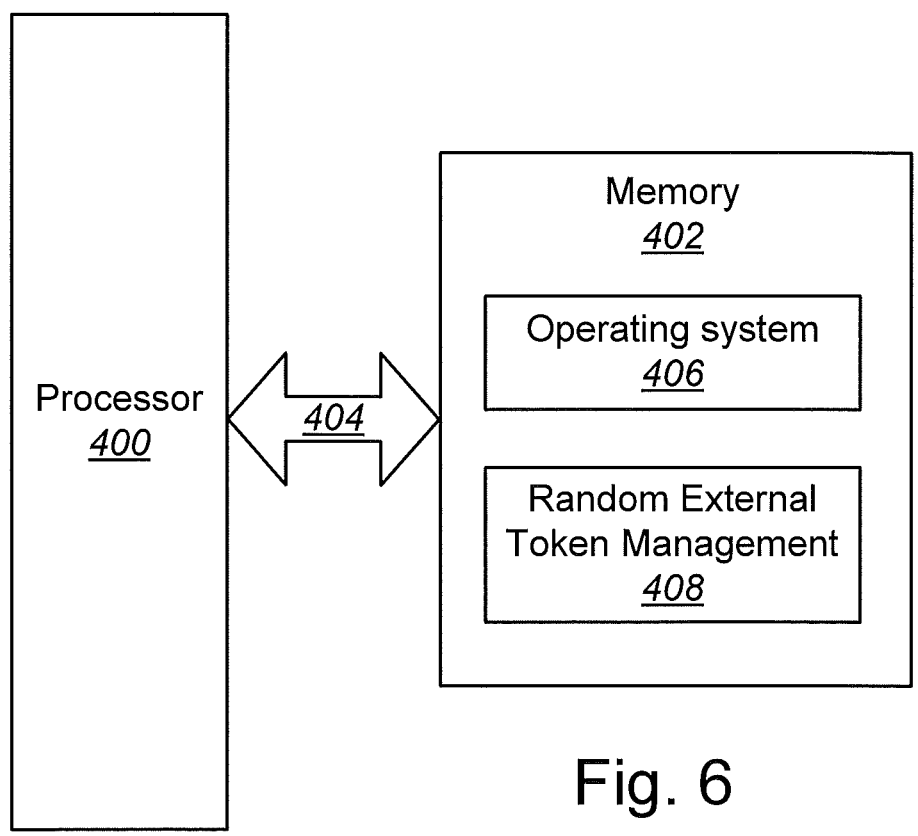
FIG. 6 is a block diagram that illustrates details of an exemplary processor and memory that may be used to prevent cross-site request forgery at one or more web servers, according to some embodiments.

FIG. 6 illustrates an exemplary processor 400 and memory 402 that may be used to prevent cross-site request forgery at one or more web servers, according to some embodiments. The processor 400 communicates with the memory 402 via an address/data bus 404. The processor 400 may be, for example, a commercially available or custom microprocessor. The memory 402 is representative of the overall hierarchy of memory devices containing the software and data used to implement a device or system for preventing cross-site request forgery at one or more web servers as described herein, in accordance with some embodiments. The memory 402 may include, but is not limited to, the following types of devices: cache, ROM, PROM, EPROM, EEPROM, flash, SRAM, and DRAM.

As shown in FIG. 6, the memory 402 may hold various categories of software and data: an operating system 406, and a RETM module 408. The operating system 406 controls operations of a device (e.g., web server 16, etc.) used to host the RETM module 14 and to allow the RETM module 14 to serve as a proxy server for preventing cross-site request forgery at one or more web servers. In particular, the operating system 406 may manage the resources of a device and may coordinate execution of various programs (e.g., the RETM module 408, etc.) by the processor 400.

The RETM module 408 comprises logic for monitoring web server responses to client requests for content having a selected characteristic; adding a hidden token to content identified as having the selected characteristic prior to serving the content to a requesting client; and storing a copy of the hidden token. The RETM module 408 comprises logic for monitoring client request content sent to the one or more web servers for a selected characteristic; and allowing client request content having the selected characteristic to be processed by a web server application only if the client request content includes a token previously provided by the proxy server and only if the token has a value matching a stored token value for the respective client. The RETM module 408 comprises logic for removing the token from client request content prior to allowing the client request content to be processed by the web server application. The RETM module 408 comprises logic for sending an error message to the requesting client in response to client request content not having a token previously provided by the proxy server and in response to client request content not having a token previously provided by the proxy server with a value matching a stored token value for the respective client.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed:

1. A method of preventing cross-site request forgery at a web server, the method comprising:
    monitoring, via a proxy associated with the web server, a web server application response to a client request for content having a selected characteristic;
    adding, via the proxy, a hidden token to the content identified as having the selected characteristic prior to serving the content to a client making the client request;
    assigning a name and value of the hidden token;
    mapping the name and value of the hidden token to a hypertext transfer protocol session between the web server and the client;
    attaching the name and value of the hidden token to a cookie sent to the client with the content;
    storing, via the proxy, a copy of the hidden token;
    monitoring, via the proxy, subsequent client request content sent to the web server for the selected characteristic;
    allowing, via the proxy, the subsequent client request content to be processed by the web server application only if the subsequent client request content includes the hidden token previously provided by the proxy, only if the hidden token has a value matching a stored token value for the respective client, and only if the value of the hidden token and a name of the hidden token has been mapped to the hypertext transfer protocol session between the web server and the client; and
    keeping an audit trail of cross-site request forgery attack attempts at the web server;
    wherein the proxy is a reverse proxy located external to the web server and that is independent of all web server applications, wherein the monitoring the web server application response and the adding the hidden token are performed dynamically in real time, and wherein the monitoring the subsequent client request content sent to the web server for a selected characteristic and the allowing subsequent client request content having the selected characteristic to be processed by the web server application are performed dynamically in real time.

2. The method of claim 1, wherein the content is hypertext markup language content.

3. The method of claim 2, wherein the content having the selected characteristic is a hypertext markup language form, wherein the hidden token is a hidden field added to the form, and wherein a name and value of the hidden field is saved to the hypertext transfer protocol session for the requesting client and attached to the cookie sent to the client.

4. The method of claim 3, wherein the selected characteristic is a form tag.

5. The method of claim 3, wherein the hidden field name comprises random characters.

6. The method of claim 5, wherein the hidden field name comprises at least forty (40) random characters.

7. The method of claim 1, further comprising removing the token from client request content, via the proxy, prior to allowing the client request content to be processed by the web server application.

8. The method of claim 1, further comprising sending an error message to the requesting client, via the proxy, in response to client request content not having a token previously provided by the proxy.

9. The method of claim 1, further comprising sending an error message to the requesting client, via the proxy, in response to client request content not having a token previously provided by the proxy with a value matching a stored token value for the respective client.

10. A reverse proxy associated with a web server and to prevent cross-site request forgery at the web server, comprising:
   a processor located external to the web server; and
   a computer readable medium coupled to the processor and comprising computer readable program code that when executed by the processor causes the processor to perform operations comprising:
   monitoring web server responses to client requests for content having a selected characteristic;
   adding a hidden token to content identified as having the selected characteristic prior to serving the content to a requesting client;
   assigning a name and value of the hidden token;
   mapping the name and value of the hidden token to a hypertext transfer protocol session between the web server and the requesting client;
   attaching the name and value of the hidden token to a cookie served to the requesting client with the content;
   storing the hidden token;
   monitoring subsequent client request content sent to the web server for the selected characteristic;
   allowing the subsequent client request content to be processed by the web server application only if the subsequent client request content includes the hidden token previously provided by the proxy, only if the hidden token has a value matching a stored token value for the respective client, and only if the value of the hidden token and a name of the hidden token has been mapped to the hypertext transfer protocol session between the web server and the client; and
   keeping an audit trail of cross-site request forgery attack attempts at the web server;
   wherein the monitoring web server responses to client requests for content having a selected characteristic, the adding a hidden token to content identified as having the selected characteristic prior to serving the content to a requesting client, the assigning the name and value of the hidden token, the mapping the name and value of the hidden token to the hypertext transfer protocol session between the web server and the requesting client, the attaching the name and value of the hidden token to the cookie served to the requesting client with the content, the storing the hidden token, the monitoring subsequent client request content sent to the web server for the selected characteristic, and the allowing the subsequent client request content to be processed by the web server application are performed dynamically in real time.

11. The proxy of claim 10, wherein the computer program code further causes the processor to perform operations comprising removing the token from client request content prior to allowing the client request content to be processed by the web server application.

12. The proxy of claim 10, wherein the computer program code further causes the processor to perform operations comprising sending an error message to the requesting client in response to client request content not having a token previously provided by the proxy server.

13. The proxy of claim 10, wherein the computer program code further causes the processor to perform operations comprising sending an error message to the requesting client in response to client request content not having a token previously provided by the proxy server with a value matching a stored token value for the respective client.

14. The proxy of claim 10, wherein the content having the selected characteristic is a hypertext markup language form, wherein the hidden token is a hidden field added to the form, and wherein a name and value of the hidden field is saved to the hypertext transfer protocol session for the requesting client and attached to the cookie sent to the client.

* * * * *